United States Patent [19]

Arikawa

[11] Patent Number: 4,971,401
[45] Date of Patent: * Nov. 20, 1990

[54] ANTI-SKID CONTROL APPARATUS FOR BRAKING SYSTEM

[75] Inventor: Tetsuro Arikawa, Kanagawa, Japan

[73] Assignee: Nippon A B S, Ltd., Tokyo, Japan

[*] Notice: The portion of the term of this patent subsequent to Jan. 20, 2004 has been disclaimed.

[21] Appl. No.: 244,556

[22] Filed: Sep. 12, 1988

Related U.S. Application Data

[63] Continuation of Ser. No. 891,361, Jul. 29, 1986, abandoned.

[51] Int. Cl.⁵ ............................................. B60T 8/62
[52] U.S. Cl. .................................... 303/111; 303/119; 188/181 C
[58] Field of Search ................... 303/962, 9.71, 92, 96, 303/102, 103, 100, 105, 110, 111, 113, 116, 119; 364/426, 426.01, 426.02; 188/181 A, 181 C

[56] References Cited

U.S. PATENT DOCUMENTS

| | | |
|---|---|---|
| 3,674,317 | 7/1972 | Mangoid . |
| 3,907,377 | 9/1975 | Mayer ........................................ 303/21 |
| 3,980,346 | 9/1976 | Leiber ...................................... 303/111 |
| 4,229,049 | 10/1980 | Ando ......................................... 303/92 |
| 4,418,966 | 12/1983 | Hattwig ................................... 303/100 |
| 4,420,191 | 12/1983 | Arikawa et al. ........................ 303/103 |
| 4,421,362 | 12/1983 | Shirai et al. .............................. 303/92 |
| 4,439,832 | 3/1984 | Sato et al. ............................... 364/426 |
| 4,451,096 | 5/1984 | Gygax ...................................... 303/109 |
| 4,547,022 | 10/1985 | Breadley ................................. 303/111 |
| 4,627,671 | 12/1986 | Matsui et al. ........................... 303/111 |
| 4,629,259 | 12/1986 | Brauninger ............................. 303/109 |
| 4,637,664 | 1/1987 | Arikawa .................................. 303/111 |
| 4,657,313 | 4/1987 | Fennel et al. ....................... 303/111 X |
| 4,753,493 | 6/1988 | Arikawa .............................. 303/111 X |
| 4,776,644 | 10/1988 | Arikawa .................................. 303/111 |

FOREIGN PATENT DOCUMENTS

2713828 10/1978 Fed. Rep. of Germany ...... 303/111

Primary Examiner—Douglas C. Butler
Attorney, Agent, or Firm—Jones, Day, Reavis & Pogue

[57] ABSTRACT

An anti-skid control apparatus for a vehicle having a brake system in which the front wheels are diagonally connected with the rear wheels, including a fluid pressure control valve device arranged between fluid pressure generating chambers of a tandem master cylinder and the wheel cylinders of the front wheels and a valve apparatus arranged between the wheel cylinder of the front wheels and those of the rear wheels. Fluid pressure is supplied to the rear wheels in accordance with the lower one of the brake fluid pressure onf the front wheels controlled by the fluid pressure control valve devices. The measuring or judging results of the skid conditions of the front and rear wheels on the same side of the vehicle are logically combined with each other to control the fluid pressure control valve devices.

6 Claims, 8 Drawing Sheets

ANTI-SKID CONTROL APPARATUS FOR BRAKING SYSTEM

This is a continuation of co-pending application Ser. No. 891,361, filed on July 29, 1986, now abandoned.

BACKGROUND OF THE INVENTION

1. Field of the Invention:

This invention relates to an anti-skid control apparatus for a vehicle braking system which can prevent the locking of the wheels.

2. Description of the Prior Art:

Such an anti-skid control apparatus for a vehicle braking system is known and includes a fluid pressure control valve device arranged between a master cylinder and a wheel cylinder of a brake for the wheel, the fluid pressures control valve device receives control signals of a control unit measuring the skid condition of the wheel to control the brake fluid pressure to the wheel cylinder; a hydraulic reservoir which, when the brake fluid pressure to the wheel cylinder is decreased with control of the fluid pressure control valve device, reserves the brake fluid discharged through the fluid pressure control valve device from the wheel cylinder; a pressure fluid supply conduit connecting the master cylinder with the fluid pressure control valve device; and a fluid pump for returning the brake fluid from the hydraulic reservoir to the pressure fluid supply conduit.

When a fluid pressure control valve device is provided for each of four wheels, and the fluid pressures of each of them are independently controlled, there is no problem with control operation. Also, when a fluid pressure control valve device is provided for each of front wheels and for both of rear wheels in common there is no problem with control operation. In the latter case, the one common fluid pressure control valve device is controlled on the basis of the lower one of the speeds of the rear wheels.

However either in the above cases, three or four fluid pressure control valve devices are used. Accordingly, the whole anti-skid control apparatus is large-sized and very heavy. Since the fluid pressure control valve devices are expensive, it requires high cost.

For example, the situation is considered where the brake fluid pressures of the front wheels are controlled by the two fluid pressure control valve devices in the diagonal or X-type conduit system and the brake fluid pressures of the rear wheels are controlled in common with a front wheels. However, when the vehicle runs on the road where the right and left sides are considerably different in frictional coefficient from each other, there is the problem that the one rear wheel being diagonal to the one front wheel on the higher frictional coefficient side will lock. In that case, the steering of the vehicle becomes unstable and very dangerous.

Further, the situation is considered where proportioning valves are provided for the rear wheels. However, the brake fluid pressures of the rear wheels increases in proportion to the input fluid pressures to the proportioning valves. The fear of locking is not avoided.

Accordingly, in order to provide an anti-skid control apparatus for a vehicle braking system which can be small-sized lightweight, and can avoid the problem of locking of rear wheels, this applicant previously proposed an anti-skid control apparatus for a vehicle braking system which includes; a fluid pressure control valve device arranged between a master cylinder and a wheel cylinder of a brake for the wheel, the fluid pressure control valve device receives control signals of a control unit measuring the skid condition of the wheel to control the brake fluid pressure to the wheel cylinder; a hydraulic reservoir which, when the brake fluid pressure to the wheel cylinder is decreased with control of the fluid pressure control valve device, reserves the brake fluid discharged through the fluid pressure control valve device from the wheel cylinder; a pressure fluid supply conduit connecting the master cylinder with the fluid pressure control valve device; and a fluid pump for returning the brake fluid from the hydraulic reservoir to the pressure fluid supply conduit. The fluid pressure control valve device being provided for a pair of front wheels. A valve apparatus receiving fluid pressures of wheel cylinders of the front wheels, arranged between the pair of front wheels and a pair of rear wheels, such that when any one of the fluid pressure control valve devices starts to control the fluid pressure of the rear wheel being at the same side as the one front wheel, the fluid pressure of the wheel cylinder of which is lower is controlled in accordance with the lower one of the fluid pressures of the wheel cylinders of the front wheels by the valve apparatus.

In the above-described anti-skid control apparatus, the control signals of the control unit are formed by judging the skid conditions of the respective front wheels. On the assumption that the front and rear wheels are provided with the tires of the same kind, the braking forces are so distributed to the wheels that the front wheels tend to lock sooner than the rear wheels, when the vehicle is rapidly braked on a road which is uniform in frictional coefficient.

However, when the above assumption is not fulfilled, for example, when only the front wheels are provided with spike tires or chains for running on a snow or ice road and rear wheels are provided with the normal tires, the rear wheels tend sooner to lock than the front wheels. In the above anti-skid control apparatus, the brake fluid pressure is not controlled with the locking of the rear wheel. When the brake fluid pressure of the front wheel is controlled over the limit locking pressure of the rear wheel, the locking of the rear wheel is not released such that the steering stability cannot be maintained.

Even in the case where the front and wheels are provided with the tires of the same kind, the rear wheel may tend sooner to lock than the front wheel when the frictional coefficient of the brake lining becomes excessively low due to thermal fade phenomenon in a front wheel brake apparatus and the limit lock pressure of the front wheel becomes excessively high and this situation is particularly problematic when the vehicle is rapidly braked on a high $\mu$ road. When a proportioning valve is used, the fluid pressure of the rear wheel is lower than that of the front wheel. However, it increases in proportion to the fluid pressure of the front wheel and reaches the limit lock pressure. The above described locking problem occurs.

FIG. 1 illustrates the above described problem. FIG. 1 shows the changes of the wheel speeds during the time when the vehicle is braked. FIG. 1B shows the control signals of the control unit. And FIG. 1C shows the changes of the brake fluid pressures of the wheels.

When the front and rear wheels are provided with the tires of the same kind, and they run on the road that is uniform in frictional coefficient, the brake fluid pressures P and P' of the front and rear wheels change with time, as shown by the solid lines in FIG. 1C, when the brake pedal is trodden at time t0. The control unit generates a brake maintaining instruction at time t1. The fluid pressure control valve device is constituted by an inlet valve and an outlet valve. The control signals consist of signals EV and AV for the inlet and outlet valves, respectively.

Although AV is still "0", EV becomes "1" at time t1. Thus, the brake fluid pressure P of the front wheel is maintained constant. The control unit generates a brake relieving instruction at time t2. Thus, EV is still "1", and AV becomes "1" from "0". As shown in FIG. 1C, the brake fluid pressure P of the front wheel decreases as shown in FIG. 1C. AV becomes "0" at time t3, while EV is still "1". Thus, the brake fluid pressure is maintained constant.

EV becomes "0" at time t4. The brake fluid pressure rises again. EV brakes again "1" at time t5. The brake fluid pressure is maintained constant. Hereafter, the brake pressure P in a stepwise fashion increases as described above. AV becomes "1" at time t6, while EV is "1". Accordingly the brake fluid pressure P decreases.

In the above-described manner, the brake fluid pressure P of the front wheel changes with time. The brake fluid pressure P' of the rear wheel is reduced by the proportioning valve and changes with time in accordance with the brake pressure P of the front wheel. The proportioning valve causes the hyteresis phenomenon by which the brake fluid pressure P' of the rear wheel changes a little later than that P of the front wheel. However, such a time lag is neglected in FIG. 1C.

Generally, a larger amount of brake fluid is required for a constant increase of brake fluid pressure in the lower pressure range under the influence of rigidity of the wheel cylinder in the rear wheel brake apparatus. Accordingly, the change range of the brake fluid pressure P' of the rear wheel is less than that of the front wheel, as shown in FIG. 1C.

The wheel speeds V, V' of the front and rear wheels change with time, as shown by the solid lines in FIG. 1A, in accordance with the above described changes of the brake fluid pressures. The preferable anti-skid control is effected. The wheel speeds are decreased without locking of the wheels.

However, when only the front wheels are provided with chains or when the thermal fade phenomenon ocecurs in the front brake apparatus, the limit lock pressure of the front wheel is increased. In such a case, the brake fluid pressure P of the front wheel changes with time, as shown by dash-lines in FIG. 1A. It changes above the level of the brake fluid pressure shown by the solid line. On the other hand, the brake fluid pressure P' of the rear wheel changes beyond the rear limit lock pressure R, as shown by the dash line. Hereafter, even when the brake fluid pressure P of the front wheel is decreased, the locking of the rear wheel cannot be relieved, partly because the range of the change of the brake fluid pressure P' is less. The front wheel is prevented from locking, as shown by the dash line in FIG. 1A. However, the rear wheel is locked. The anti-skid control is not preferably effected. The steering stability is lost. A very dangerous situation results.

SUMMARY OF THE INVENTION

Accordingly, it is an object of this invention to provide an anti-skid control apparatus for a vehicle braking system which can be small-sized and lightweight, and can avoid the problem of locking of rear wheels in all cases.

In accordance with an aspect of this invention, an anti-skid control apparatus for a vehicle braking system is provided including: (A) a pair of front wheels, and a pair of rear wheels in which wheel cylinders are diagonally connected in by conduits; (B) a first fluid pressure control valve device for controlling the brake fluid pressure of the wheel cylinder of one of the front wheels arranged between a first fluid pressure generating chamber of a tandem master cylinder and the wheel cylinder of the one front wheel; (C) a second fluid pressure control valve device for controlling the brake fluid pressure of the wheel cylinder of another of the front wheels arranged between a second fluid pressure generating chamber of the tandem master cylinder and the wheel cylinder of the other front wheel; (D) a control unit for measuring or judging the skid conditions of said front and rear wheels and for generating instructions for controlling the first and second fluid pressure control valve devices; and (E) a valve apparatus for generating a fluid pressure in accordance with the lower one of the brake fluid pressures of the front wheels controlled with the first and second fluid pressure control valves devices arranged between the wheel cylinders of the front wheels and those of the rear wheels. The improvements in which the control unit combines logically the measuring or judging result of the skid conditions of one of the front wheel with that of the rear wheel on the same road side as the one front wheel for generating the instruction for controlling the first fluid pressure control valve device. The control unit also combines logically the measuring or judging result of the skid condition of the other front wheel with that of the other rear wheel for generating the instruction for controlling said second fluid pressure control valve device.

The foregoing and other objects, features, and advantages of the present invention will be more readily understood upon consideration of the following detailed description of the preferred embodiments of the invention, taken in conjunction with the accompanying drawings.

DESCRIPTION OF THE PREFERRED EMBODIMENTS

Figure 1:
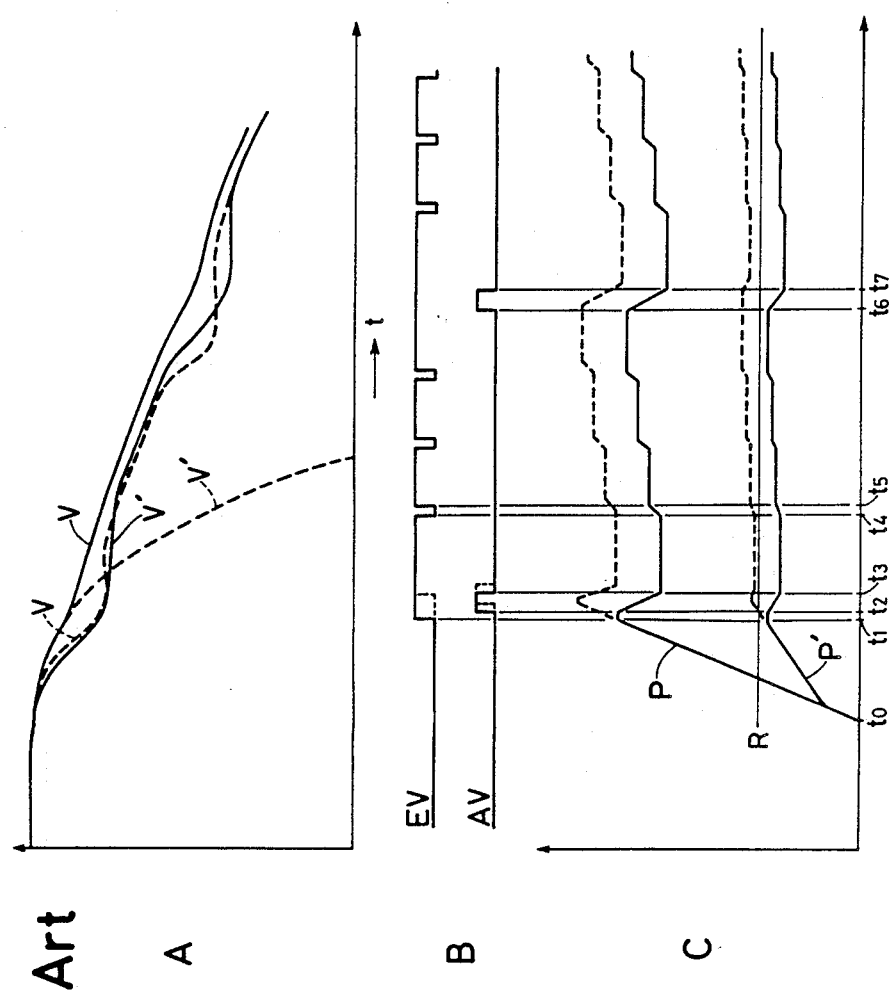
FIG. 1A, 1B and 1C are graphs explaining the operation of a prior art anti-skid control apparatus.
Figure 2:
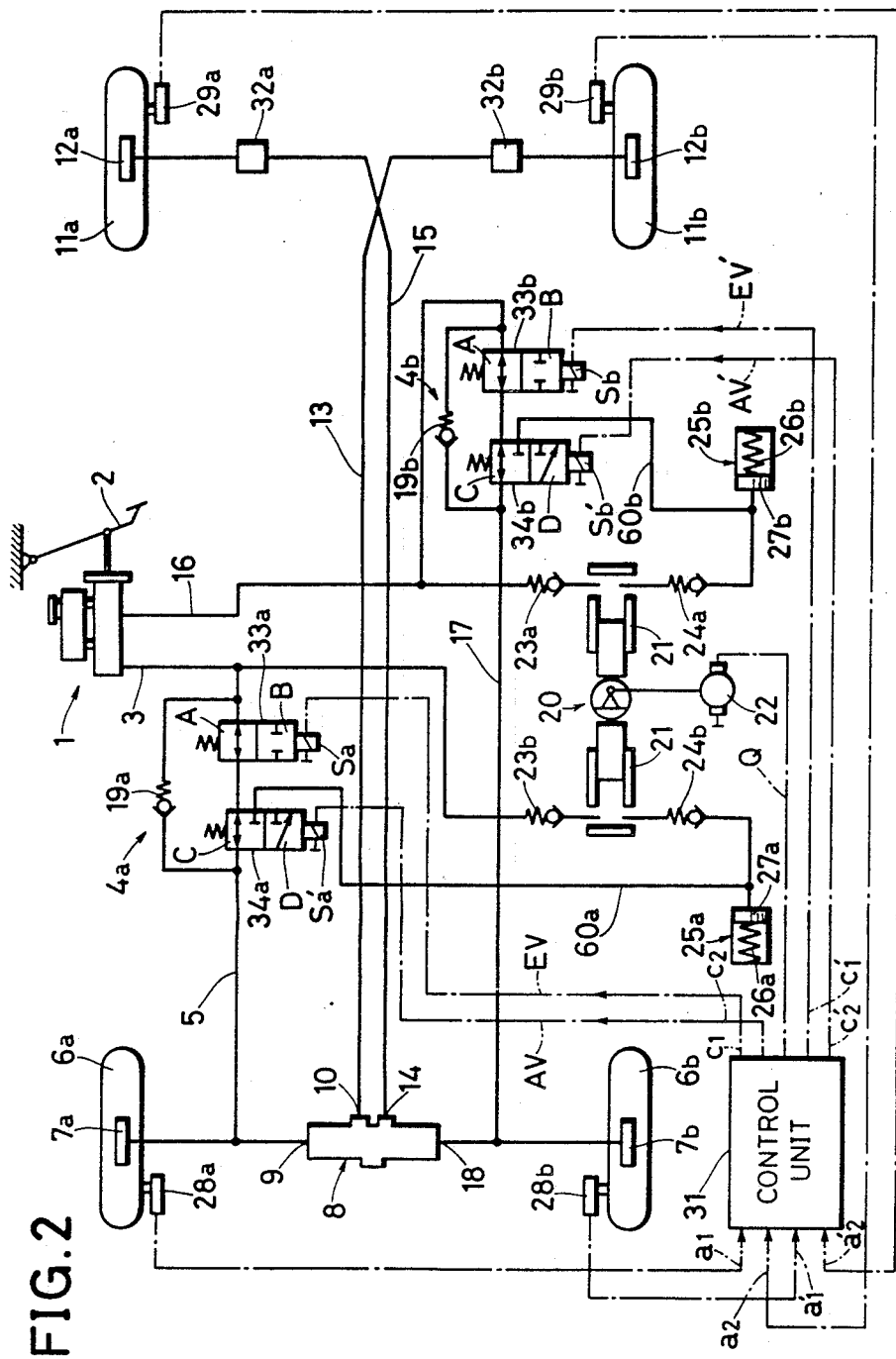
FIG. 2 is a schematic view of a anti-skid control apparatus according to an embodiment of this invention.

In FIG. 2, a brake pedal 2 is connected to a tandem master cylinder 1. One fluid pressure chamber of the tandem master cylinder 1 is connected to a wheel cylinder 7a of a right front wheel 6a through a conduit 3, an electro-magnetic two position valve device 4a and a conduit 5. The conduit 5 is further connected to a first input port 9 of a valve apparatus 8 to be hereinafter described in detail. The first input port 9 normally communicates with a first output port 10 in the valve apparatus 8. The first output port 10 is connected to a wheel cylinder 12b of a left rear wheel 11b through a conduit 13 and a proportioning valve 32b.

Another fluid pressure chamber of the tandem master cylinder 1 is connected to a wheel cylinder 7b of a left front wheel 6b through a conduit 16, an electro-magnetic two position valve device 4b and a conduit 17. The conduit 17 is further connected to a second input port 18 of the valve apparatus 8. The second input port 18 normally communicates with a second output port 14 in the valve apparatus 8. The second output port 14 is connected to a wheel cylinder 12a of a right rear wheel 11a through a conduit 15 and a proportional valve 33a.

The two position valve devices 4a and 4b consist of inlet and outlet valves 33a, 34a and 33b, 34b, respectively. Discharge openings of the outlet valves 34a and 34b are connected through conduits 60a and 60b to hydraulic reservoirs 25a and 25b, respectively. The hydraulic reservoirs 25a and 25b include pistons 27a and 27b slidably fitted to a casing and relatively weak springs 26a and 26b. Reserving chambers of the reservoirs 25a and 25b are connected to suction openings of a fluid pressure pump 20.

Although the fluid pressure pump 20 is schematically shown, it consists of a pair of casings 21, pistons slidably fitted to the casings 21, an electro-motor 22 for reciprocating the pistons, and check valves 23a, 23b, 24a, 24b. Supply openings of the fluid pressure pump 20 or the sides of the check valves 23a, 23b are connected to the conduits 3 and 16.

Wheel speed sensors 28a, 28b, 29a and 29b are associated with the wheels 6a, 6b, 11a and 11b respectively, and generate pulse signals having frequencies proportional to the rotational speeds of the wheels 6a, 6b, 11a and 11b. The pulse signals of the wheel speed sensors are supplied to a control unit 31.

Figure 3:
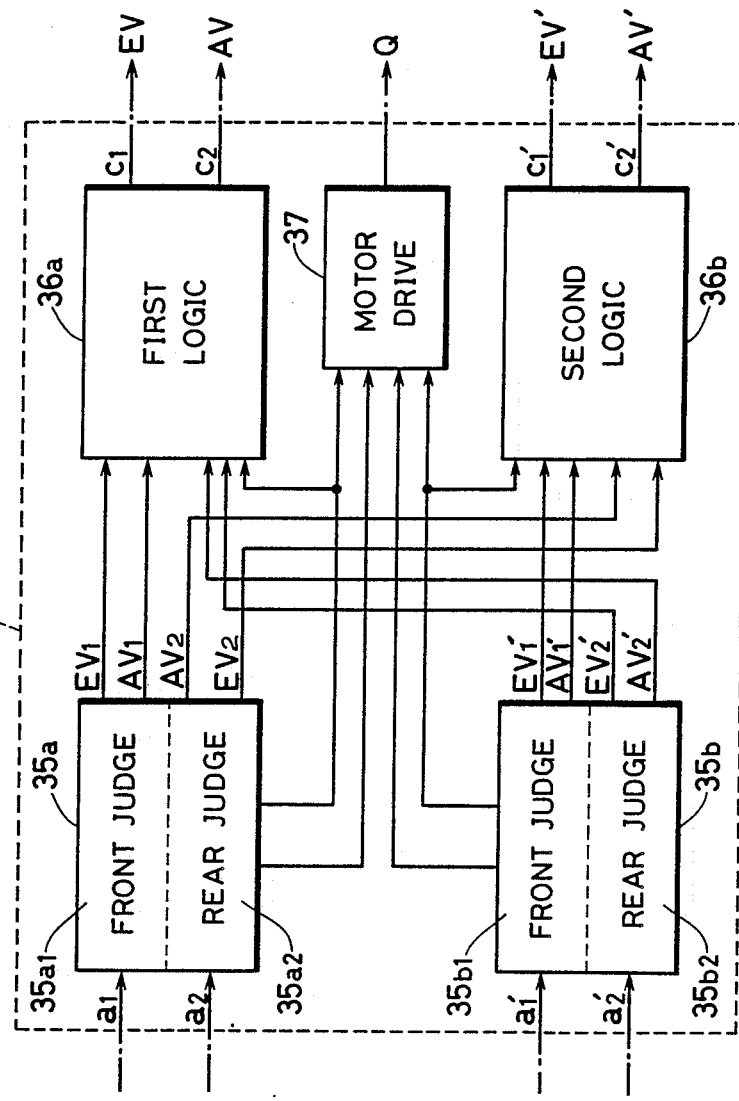
FIG. 3 is a block diagram of a control unit in FIG. 2.

As shown in FIG. 3 the control unit 31 consists of first and second judge circuits 35a and 35b, first and second logic circuits 36a and 36b and a motor drive circuit 37. The circuits 35a, 35b, 36a and 36b will be hereinafter described in detail. Output terminals of the wheel speed sensors 28a and 29b are connected to input terminals a1 and a2 of the first judge circuit 35a, while output terminals of the wheel speed sensors 28b and 29a are connected to input terminals a1' and a2'. In other words, the first judge circuit 35a receives the wheel speed signals of the right front wheel 6a and left rear wheel 11b, judges them and supplies the judge results to the first or second logic circuit 36a and 36b. As will be hereinafter described, the judge results are logically combined with each other in the logic circuits 36a and 36b, and control signs EV and AV are generated at output terminal c1 and c2 of the control unit 31. The second judge circuit 35b receives the wheel speed signals of the left front wheel 6b and right rear wheel 11a, judges them and supplies the judge results to the first or second logic circuit 36a and 36b. As will be hereinafter described, the judge results are logically combined with each other in the logic circuits 36a and 36b, and control signals EV' and AV' are generated at output terminal C'1 and C'2 of the control unit 31. The control signal EV, AV, EV' and AV' are supplied to solenoid portions Sa, Sa', Sb and Sb' of the valves 33a, 34a, 33b and 34b, respectively. Dash lines represent electric lead wires.

Although schematically shown, the electromagnetic valves 33a, 33b, 34a and 34b have well-known constructions. When the control signals AV, EV and AV', EV' are "0", the valves take first positions A and C for increasing the brake pressure to the brake for the wheel, respectively. In the first positions A and C, the master cylinder side and the wheel cylinder side are made to communicate with each other. When the control signals AV, EV and AV', EV' are "1", the valves take second positions B and D respectively, for decreasing the brake pressure to the brake. In the second positions B and D, the communication between the master cylinder side and the wheel cylinder side is interrupted, while the communication between the wheel cylinder side and the reservoir side is made. The brake fluid is discharged through the conduit 60a and 60b into the reservoir 25a and 25b from the wheel cylinders 7a, 7b and 12a and 12b. When the control signals AV, AV' and EV, EV' are "0" and "1", respectively, the valves 33a and 33b take the second positions B and the valves 34a and 34b take the first positions C. Thus, the brake pressure to the brake are maintained constant.

The control unit 31 further generates a drive signal Q for the motor 22, which is maintained during the skid control operation.

Next, the details of the valve apparatus 8, to which the brake fluid pressures are applied from the wheel cylinders 7a and 7b of the front wheels 6a and 6b, will be described which reference to FIG. 4.

A stepped through hole 61a is axially formed in a casing 61 for the valve apparatus 8. A cover member 62 provided with a seal ring 65 is screwed to a right opening portion of the casing 61. Another cover member 66 provided with a seal ring 67 is screwed to a left opening portion of the casing 61. The above described first and second input ports 9 and 18 are formed in the cover members 62 and 66, respectively.

A piston 38 provided with seal rings 39 and 40 is slidably fitted to a central portion of the stepped hole 61a. Rod portion 41a and 41b of the piston 38 normally contact valve balls 47a and 47b across output chambers 50a and 50b, respectively. The valve balls 47a and 47b are positioned in input chambers 49a and 49b, and are urged towards valves seats 46a and 46b by springs 48a and 48b. The one valve seat 46b is formed in the inner wall of the casing 61. The other valve seat 46a is formed in a valve forming member 45 which is pressedly fitted to a cylindrical member 44. The output chamber 50a is inside of the cylindrical member 44 and it communicates through holes 44a made in the circumferential wall portion, with the first output port 10. The other output chamber 50b communicates directly with the second output port 14.

Spring receiving rings 42a and 42b are slidably fitted to the rod portions 41a and 41b of the piston 38 for receiving springs 43a and 43b. They are urged towards the center by the springs 43a and 43b. Normally, flange portions of the spring receiving rings 42a and 42b contact with stepped portions 58a and 58b of the casing 61. There are little gaps between the spring receiving rings 42a, 42b and a main portion 59 of the piston 38. Thus, the neutral position of the piston 38 is determined in the stepped hole 61a.

A switch 52 provided with a seal ring 53 is tightly fitted into a hole made in the central wall of the casing 61. An actuator of the switch 52 is engaged with a groove 51 made in the circumference of the piston 38, in the neutral position. An electric wire 54 from the switch 52 is connected through a contact 55 of a b-contact type relay and a warning lamp 56 to a positive terminal of a battery 57. The warning lamp 56 is energized when the contact 55 remains closed and the switch 55 is operated. The contact 55 of the b-contact type relay normally closes and is opened when the antiskid apparatus of FIG. 2 operates. For example, when the fluid pressure pump 20 operates, it is opened.

In the shown neutral position of the piston 38, the valve balls 47a and 47b are separated from the valve seats 46a and 46b by the rod portions 41a and 41b. Thus, the input chambers 49a and 49b are made to communicate with the output chambers 50a and 50b.

In FIG. 2, check valves 19a and 19b are connected in parallel with the electromagnetic valves 4a and 4b. They permit brake fluid to flow only in the direction from the wheel cylinder side towards the master cylinder side. Both sides of the valves 4a and 4b communicate with each other through throttling holes in the A- and C- positions. Accordingly, pressurized fluid is rapidly returned through the check valves 19a and 19b to the master cylinder 1 from the wheel cylinders 7a, 7b, 12a and 12b, when the brake is released.

The first and second judge circuits 35a and 35b have the same circuit constructions. Accordingly, only the first judge circuit 35a will be described in detail with reference to FIG. 5.

The first and second judge circuits 35a and 35b consist of front wheel judge parts 35a1, 35b1 and rear wheel judge parts 35a2, 35b2, respectively. The signals from the wheel speed sensors 28a and 29b are supplied to wheel speed signal generators 72a and 72b. Digital or analogue outputs proportional to the wheel speeds are obtained from the wheel speed signal generators 72a and 72b, and are supplied to approximate vehicle or body speed signal generators 76a and 76b, slip signal generators 77a and 77b and differentiators 73a and 73b.

The approximate vehicle speed signal generators 76a and 76b receive the outputs of the wheel speed signal generators 72a and 72b. The outputs of the approximate vehicle speed signal generators 76a and 76b are equal to the outputs of the wheel speed signal generators 72a and 72b, until the deceleration of the wheel reach a predetermined value. After it becomes higher than the predetermined value, the outputs of the approximate vehicle speed signal generators 76a and 76b decrease at a predetermined gradient with time. The initial outputs are equal to the outputs at the time when the deceleration of the wheel has reached the predetermined value. The outputs of the approximate vehicle speed signal generators 76a and 76b are supplied to a selecting circuit 71. The higher of the outputs of the approximate vehicle speed generators 76a and 76b is selected by the selecting circuit 71, and it is supplied to the slip signal generators 77a and 77b to be compared with the outputs of the wheel speed signal generators 72a and 72b. A predetermined reference ratio or amount is set in the respective slip signal generators 77a and 77b. The reference ratio or amount is for example, 0.15 (15%).

Generally, a slip ratio S of the wheel is given by the following formula:

$$S = 1 - \frac{\text{wheel speed } (V,V')}{\text{vehicle speed } (E)}$$

When $$\left(1 - \frac{V,V'}{E}\right)$$

is larger than the reference ratio, a slip signal S is generated from the slip signal generator 77a or 77b. Namely the output of the slip signal generator 77a, or 77b becomes the higher level "1" of the two levels "1" and "0".

The differentiators 73a and 73b receive the outputs of the wheel speed signal generators 72a and 72b, and differentiate them with respect to time. The outputs of the differentiators 73a and 73b are supplied to deceleration signal generators 75a and 75b, and to acceleration signal generators 74a and 74b. A predetermined threshold deceleration (for example, −1.5 g) is set in the deceleration signal generators 75a and 75b, and it is compared with the outputs of the differentiators 73a and 73b. A predetermined threshold acceleration (for example, 0.5 g) is set in the acceleration signal generators 74a and 74b, and it is compared with the outputs of the differentiators 73a and 73b. When the deceleration of the wheel becomes larger than the predetermined threshold deceleration (−1.5 g), a deceleration signal −b is generated from the deceleration signal generator 75a or 75b. When the acceleration of the wheel becomes larger than the predetermined threshold acceleration (0.5 g), an acceleration signal +b is generated from the acceleration signal generator 74a, or 74b.

Output terminals of the acceleration signal generators 74a and 74b are connected to negation input terminals (indicated by circle 0) of AND gates 92a, 92b, negation input terminals of AND gates 90a, 90b, OFF delay timers 88a, 88b and first input terminals of OR gates 94a, 94b. Output terminals of the OFF delay timers 88a, 88b are connected to input terminals of the AND gates 90a, 90b. Output terminals of the AND gates 90a, 90b are connected to input terminals of pulse generators 78a, 78b and input terminals of AND gates 93a, 93b. Output terminals of the pulse generators 78a, 78b are connected to negation input terminals of the AND gates 93a, 93b. Stepwise brake-increasing signal generators 81a, 81b are constituted by the acceleration signal generators 74a, 74b, the OFF-delay timers 88a, 88b, the pulse generator 78a, 78b, the OR gates 94a, 94b, and the AND gates 90a, 90b, 93a, 93b, and they generate pulse signals to slowly increase the brake pressure for delay time of the OFF delay timers 88a, 88b. Output terminals of the AND gates 93a, 93b are connected to second input terminals of the OR gates 94a, 94b.

Output terminals of the deceleration signal generators 75a, 75b are connected to third input terminals of the OR gates 94a, 94b and to input terminals of the approximate vehicle speed signal generators 76a, 76b. Output terminals of the slip signal generators 77a, 77b are connected to other input terminals the AND gates 92a, 92b. Output terminals of the AND gates 92a, 92b are connected to fourth input terminals of the OR gates 94a, 94b.

Signals EV1, EV2 and AV1, AV2 at output terminals of the OR gates 94a, 94b and AND gates 92a, 92b are supplied to the following stage, or the first or second logic circuit 36a or 36b.

The output terminals of the AND gates 92a, 92b are further connected to OFF delay timers 95a, 95b. Signals AV1Z and AV2Z at the output terminals of the OFF-delay timers 95a, 95b are supplied to the motor drive circuit 37. The delay time is sufficiently long so as to maintain the output of the OFF-delay timers 95a, 95b at the higher "1" of the two levels "1" and "0" during the anti-skid control operation, after the outputs of the AND gates 92a, 92b become the lower level "0" of the two levels "1" and "0".

Signals EV1′, EV2′, AV1′, AV2′ corresponding to the above signals EV1, EV2, AV1, AV2, respectively, are similarly formed in the second judge circuit 35b.

The first and second logic circuits 37a and 36b have the same circuit construction. Accordingly, only the first logic circuit 36a will be described with reference to FIG. 6.

The first logic circuit 36a receives the output signals EV1, AV1, AV1Z of the first judge circuit 35a and the output signals EV2′, AV2′ of the second judge circuit 35b. The output signal EV1 is supplied to a first input terminal of an OR gate 100. The output signal AV1 is supplied to one input terminal of one OR gate 103. The output signal EV2′ is supplied to another input terminal of an AND gate 101. The output signal AV1Z is supplied through a NOT gate 102 to another input terminal of the AND gate 101. The output signal AV2′ is supplied to one input terminal of another AND gate 104 and further it is supplied through an ON-delay timer 105 and a NOT gate 106 to another input terminal of the AND gate 104.

Output terminals of the OR gates 100 and 103 are connected through amplifiers 107 and 108 to the solenoid portions Sa and Sa′ of the inlet and outlet valves 33a and 34a, shown in FIG. 2. The amplified control signals EV, AV of the amplifiers 107 and 108 are supplied to the solenoid portions Sa, Sa′ of the inlet and outlet valves 33a and 34a. The signal Av2′ represents that the slip of the right rear wheel 11a becomes higher than the predetermined slip value. The brake fluid pressure of the right front wheel 6a is decreased with the signal Av2′. When the signal AV2′ continues too long, it is limited to a predetermined time for preventing excessive decrease of the brake of the right front wheel 7a. The predetermined time is set as a delay time in the ON- delay timer 105.

Figure 6:
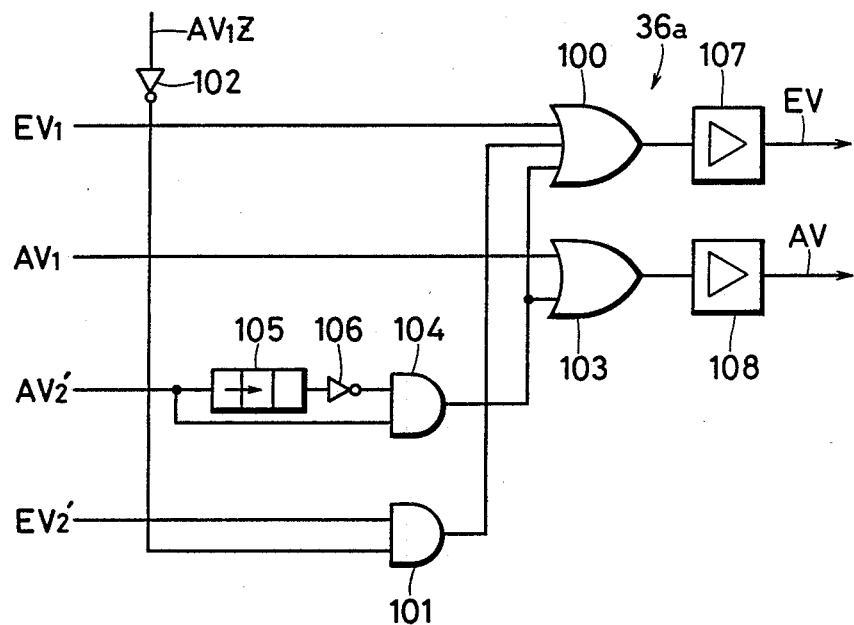
FIG. 6 is a circuit diagram of a first logic circuit in FIG. 3.
Figure 7:
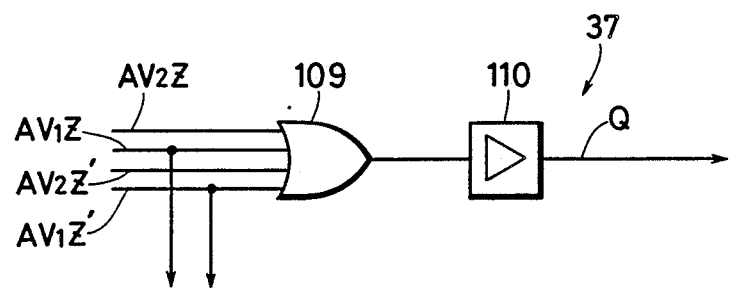
FIG. 7 is a circuit diagram of a motor drive circuit in FIG. 3.

FIG. 7 shows the motor drive circuit 37 which consists of an OR gate 109 and an amplifier 110. The output signals AV1Z and AV2Z of the first judge circuit 35a are supplied to first and second input terminals of the OR gate 109. The signals AV1Z and AV2Z are formed by the skid conditions of the right front wheel 6a and left rear wheel 11b, in the first judge circuit 35a. Similarly signals AV1Z′ and AV2Z′ are formed by the skid conditions of the left front wheel 6b and right rear wheel 11a. They are supplied to fourth and third input terminals of the OR gate 109. The second and forth input terminals of the OR gate 109 are connected to the first and second logic circuits 36a and 36b. In the one logic circuit 36a, as shown in FIG. 6, the second input terminal is connected through the NOT gate 102 to the AND gate 101. An output of the OR gate 109 is amplified by the amplifier 110. The output signal Q of the amplifier 110 is supplied to the motor 22 shown in FIG. 2.

Signals EV′, AV′ corresponding to the signals EV, AV are similarly formed by the second logic circuit 36b. They are supplied to the solenoid portions Sb, Sb′ of the inlet and outlet valves 33b, 34b.

Next, there will be described operations of the above described anti-skid apparatus.

It is now assumed that the wheels 6a, 6b, 11a and 11b are provided with the tires of a same kind and run on the road which is uniform in frictional coefficient.

The vehicle driver treads the brake pedal 2. At the beginning of the braking operation, the control signals EV, AV, EV′, AV′ are "0" from the control unit 31. Accordingly, the valves 33a, 33b and 34a, 34b are in the A-position and the C-position. Pressurized fluid is supplied from the master cylinder 1 to the wheel cylinders 7a and 7b of the front wheels 7a and 7b through the conduits 3, 16, the valves 33a, 33b, 34a, 34b and the conduits 5, 17. Further it is supplied to the wheel cylinders 12a, and 12b of the rear wheels 11a and 11b through the first and second input ports 9, 18, the input chambers 49a, 49b, the output chambers 50a, 50b, the first and second output ports 10, 14 in the valve apparatus 8, and the conduits 13 and 15. Thus, the wheels 6a, 6b, 11a and 11b are braked. The proportioning valves 32a and 32b effect the well-known operations. When the input pressure is lower than a predetermined value it is transmitted to the output side without reduction. When the input pressure is higher than the predetermined value, it is reduced nearly at a constant rate, and transmitted to the output side.

When the deceleration of the wheels 6a, 6b, 11a and 11b becomes higher than the predetermined deceleration with the increase of the brake fluid pressure, the deceleration signal −b is generated from the deceleration signal generators 75a, 75b in the judge circuits 35a, 35b. In order to facilitate understanding, it is assumed that the deceleations or slips of the wheels 6a, 6b, 11a, 11b reach the predetermined deceleration or slip at the same time.

The signals EV1, EV2, EV1′, EV2′ become "1" with the deceleration signal −b. The output signals EV, EV′ of the logic circuits 36a, 36b becomes "1" with the signals EV1, EV2, EV1′, EV2′. The solenoid portions Sa and Sb are energized. The valves 33a and 33b take the second position B. The conduits 3, 16 are interrupted from the conduits 5, 17. Further, the conduits 5, 17 are interrupted from the conduits 60a, 60b. Thus the brake fluid pressures of the wheel cylinders 7a, 7b, 12a, and 12b are maintained constant.

When the decleration of the wheels becomes lower than the predetermined deceleration, the deceleration signal −b disappears from the deceleration signal generators 75a, 75b, and valves 33a, 33b are again changed into the position A. Thus, the brake fluid pressure again increases. When the slip of the wheels reaches the predetermined slip, the slip signal S is generated from the slip signal generators 77a, 77b. The acceleration signal generators 74a, 74b do not yet generate the acceleration signal +b. Accordingly, the output AV1, AV2, Av1′, AV2′ of the AND gates 92a, 92b becomes "1". The outputs AV, AV′, EV, EV′ of the logic circuits 37a, 37b become "1". The valves 33a, 33b and 34a, 34b are changed over into the positions B and D. The conduits 3 and 16 are interrupted from the conduits 5 and 17, respectively. However, the conduits 5 and 17 are made to communicate with the conduits 60a and 60b. The pressurized fluid is discharged from the wheel cylinders 7a and 7b of the front wheels 6a and 6b into the hydraulic reservoirs 25a and 25b through the conduits 5, 17, 60a and 60b. The pressurized fluid from the wheel cylinders 12a and 12b of the rear wheels 11a and 11b is discharged through the conduits 15, 13 the output ports 14, 10, the output chambers 50a, 50b, the input chambers 49a, 49b, the input ports 18, 9 in the valve apparatus 8, and the conduits 17, 5, 60b and 60a, into the hydraulic reservoirs 25a and 25a. Thus the brake pressures of the wheels 6a, 6b, 11a and 11b are relieved.

The fluid pressure pump 20 starts to drive with the signals AV1, AV2, AV1', AV2'. The brake fluid is sucked from the reservoirs 25a and 25b and supplied towards the conduits 3 and 16, at nearly the same rate by the fluid pressure pump 20. Accordingly, the fluid pressures at both sides of the piston 38 are decreased at nearly the same rate. The piston 38 remains stopped at the neutral position, and the valve balls 47a and 47b remain separated from the valve seats 46a and 46b.

When the wheel speeds become higher, and the accelerations of the wheels reach the predetermined acceleration, the acceleration signal +b is generated from the accelerator signal generators 74a, 74b. Thus, the outputs EV1, EV2, EV1', EV2' of the judge circuits 35a, 35b become "1". The outputs EV, EV' of the logic circuits 36a, 36b become "1". Accordingly, the brake fluid pressure of the wheels is maintained constant.

The pulse generators 78a, 78b start to drive with disappearance of the acceleration signal +b. The outputs EV1, EV2, EV1', EV2' change as "0", "1", "0", "1", .... for the delay time of he OFF-delay timers 88a, 88b. Accordingly, the outputs EV, EV' of the logic circuits 36a, 36b change similarly. The brake pressures of the wheel increase in a stepwise manner.

Hereafter, the above-described operations are repeated. When the running speed of the vehicle reaches the desired speed, or when the vehicle stops, the brake pedal 2 is released from treading. The brake fluid is returned from the wheel cylinders 7a, 7b, 12a, 12b to the master cylinder 1 through the conduits, the valve apparatus 8, the valves 4a, 4b, and the check valves 19a and 19b.

In the above description, the control signals EV1, EV2, EV1', EV2' or AV1, AV2, AV1', AV2' become "0" or "1" at the same time. However, when the frictional coefficients of the road are considerably different at the right and left sides of the road, the control signals do not become "0" or "1" at the same time. For example, when the frictional coefficient of the right side of the road is relatively small, the control signal EV1, EV2' or AV1, AV2' first becomes "1". Next, such a case will be described.

For simplifying the description, it is assumed that the deceleration signals −b or slip signals of the right wheels 6a, 11a are generated at the same time. In other words, the outputs EV1, EV2' or AV1, AV2' of the judge circuits 35a, 35b become "0" or "1" at the same time. The output EV or AV of the first logic circuit 36a becomes "0" or "1" with the output EV1 or AV2'. The brake fluid pressure of the right front wheel 6a is maintained constant or decreased by functions of the valves 33a, 34a. The left wheels 6b an 11b on the higher frictional road side (high μ side) do not yet tend to lock. Accordingly, the outputs EV', AV' are "0". The valves 33b, 34b are not energized. The brake fluid pressure of the front wheel 6b continues to increase.

Figure 4:
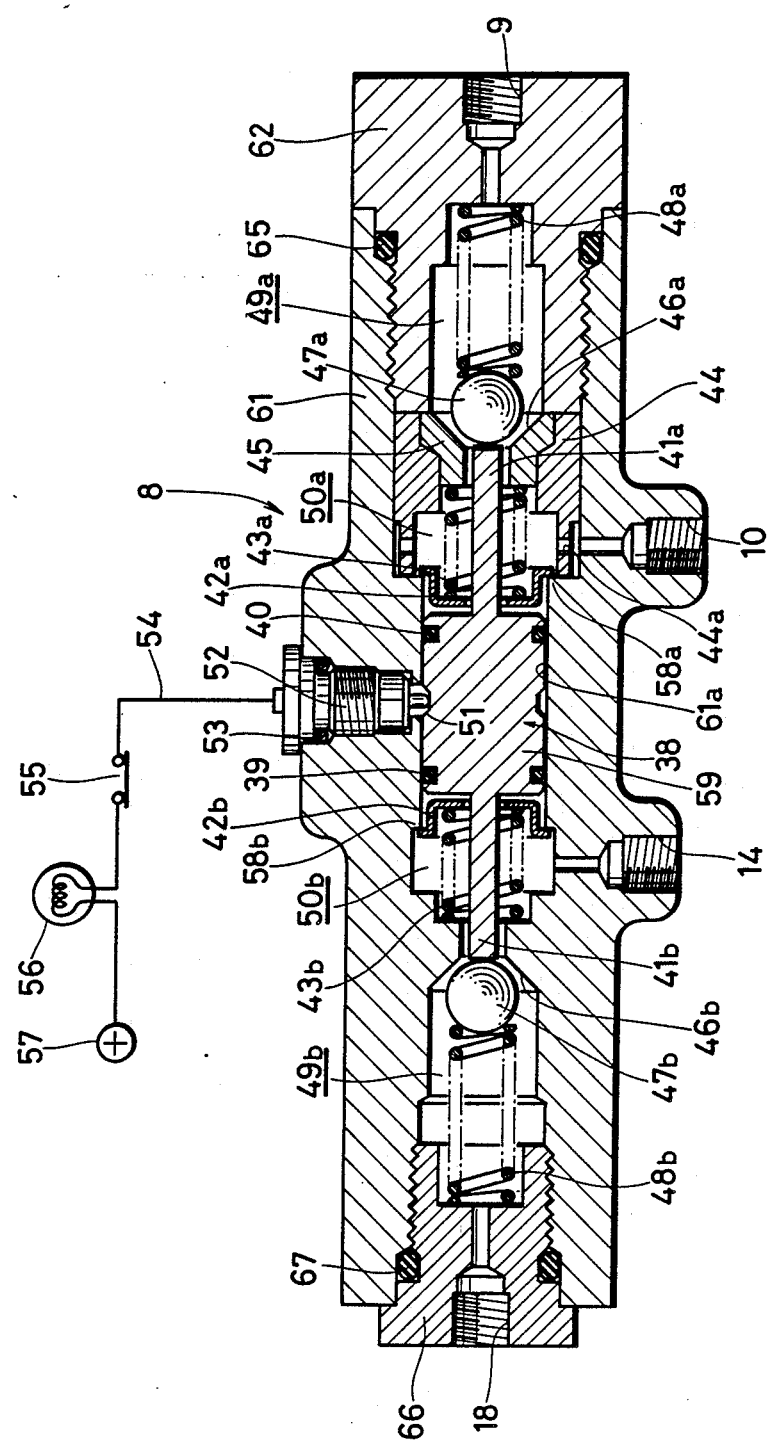
FIG. 4 is an enlarged cross-sectional view of a valve apparatus in FIG. 2.

In the valve apparatus 8 shown in FIG. 4, the fluid pressure is decreased in the input and output chambers 49a and 50a at the right side of the piston 38. On the other hand, the brake fluid continues to be supplied to the wheel cylinders 7b and 12a from the master cylinder 1. Accordingly, the rightward pushing force to the piston 38 becomes larger. The piston 38 is moved rightwards. Thus, the left valve ball 47b comes to seat the valve seat 46b by spring action of the spring 48b. On the other hand, the right valve ball 47a is further separated from the valve seat 46a by the rod portion 41a. The right input chamber 49a remains communicating with the right output chamber 50a, while the left input chamber 49b is interrupted from the left output chamber 50b. Thus, the fluid supply to the wheel cylinder 12a of the one rear wheel 11a is interrupted from the master cylinder 1.

When the piston 38 is further moved rightwards with the decrease of the fluid pressure of the right input and output chambers 49a and 50a, the volume of the left output chamber 50b, interrupted from the left input chamber 49b, is increased. In other words, the fluid pressure of the wheel cylinder 12a of the rear wheel 11a is lowered since the wheel cylinder 12a communicates with the left output chamber 50b through the output port 14 and the conduit 15.

When the control signals EV, AV become again "0" to increase the fluid pressure of the input and output chambers 49a and 50a, the piston 38 is moved leftwards to decrease the volume of the left output chamber 50b, while the left valve ball 47b seats in the valve seat 46b. Thus, the brake fluid pressure of the wheel cylinder 12a of the rear wheel 11a is again increased. The above-described operation means that the brake fluid pressure of the wheel cylinder 12a of the rear wheel 11a at the same side as the front wheel 7a is controlled in accordance with the brake fluid pressure of the wheel cylinders 6a of the front wheel 7a. Thus, the rear wheel 11a running on the lower frictional coefficient side of the road is prevented from locking, similarly to the front wheel 6a at the same side. If the brake fluid pressure of the wheel cylinder 12a of the rear wheel 11a were to be controlled in common with the brake fluid pressure of the wheel cylinder 7b of the front wheel 6b running on the higher frictional coefficient side, the rear wheel 11a would lock.

The above described case involves the situation where all of the wheels are provided with the tires of the same kind. Next, there will be described the case where only the front wheels 6a, 6b are provided with spike tires or chains. It is assumed that the vehicle runs on the split road, the frictional coefficients of which are considerably different at the right and left sides, and further it is assumed that the right front and rear wheels 6a, 11a run on the low-μ side and the left front and rear wheels 6b, 11b run on the high-μ side.

Figure 8:
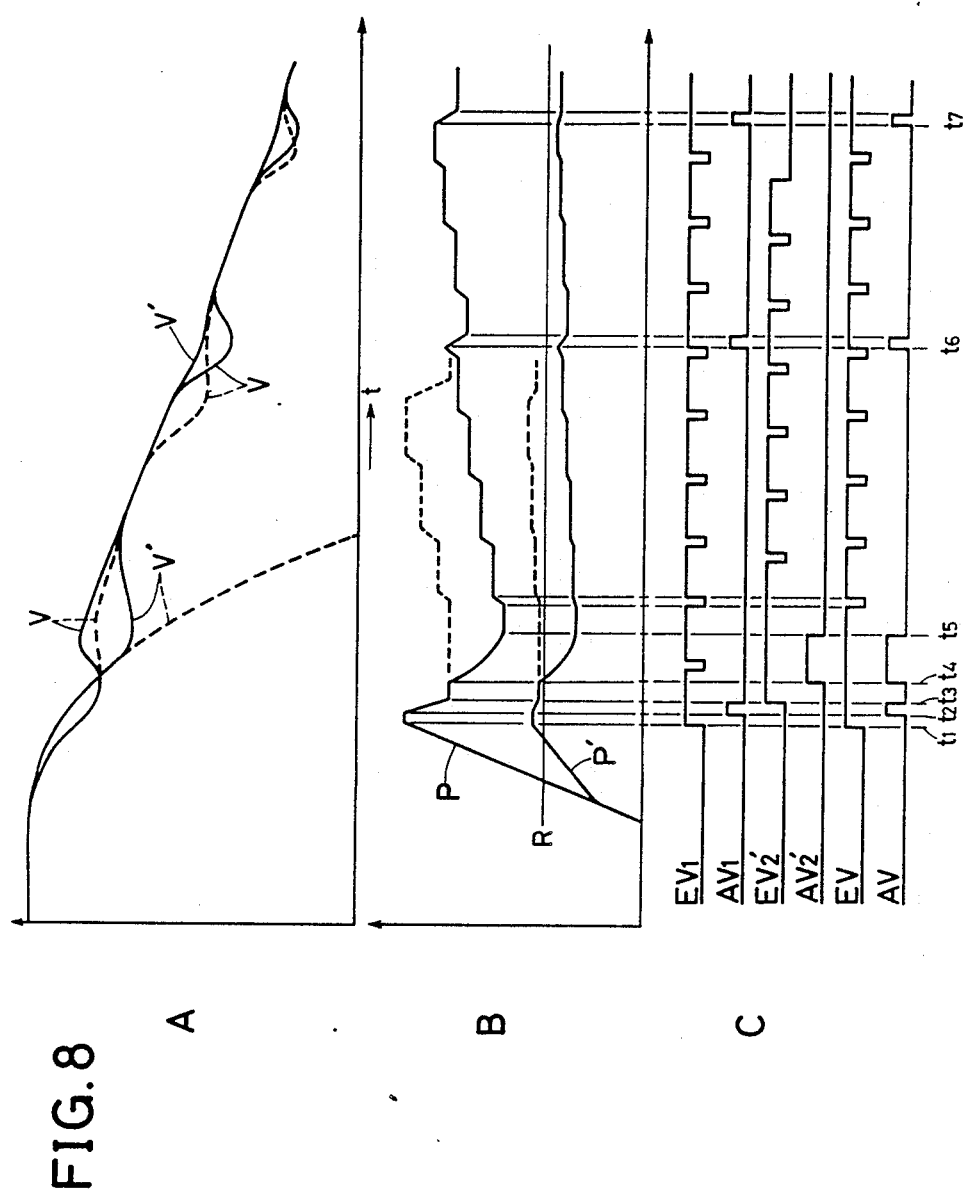
FIGS. 8b, 8b and 8c and FIGS. 9a, 9b, and 9c are graphs for explaining operations of the embodiment of this invention

When the brake pedal 2 is rapidly trodden, the brake fluid pressure P of the front wheel 6a increases as shown in FIG. 8B. The output EV1 of the first judge circuit 35a becomes "1" at time t1. Accordingly, the output EV of the first logic circuit 36a becomes "1" at time t1 as shown in FIG. 8C. Thus, the brake fluid pressure P is maintained constant.

The output AV1 of the first judge circuit 35a becomes "1" at time t2. Accordingly the output AV of the first logic circuit 36a becomes "1" as shown in FIG. 8C. Thus, the brake fluid pressure P is decreased as shown in FIG. 8B. Although the output AV1 disappears at time t3, the output EV1 is still "1". Accordingly, the output EV is "1", and the brake fluid pressure P is maintained constant.

The output AV2' becomes "1" at time t4. Thus, the slip of the right rear wheel 11a reaches the predetermined value. As is clear from the circuit of FIG. 5, when the output AV2' is "1", the output EV2' is "1". However, after the output AV1Z of the front wheel is generated, the output of the AND gate 101 becomes "0". On the other hand, the output of the AND gate 104 receiving the output AV2' of the rear wheel is supplied to the OR gate 100. Accordingly, although the output EV, becomes "0", the output EV remains "1". Thus, the brake fluid pressure P is decreased at time t4 as shown in FIG. 8B.

The output AV2' disappears at time t5. However, the output EV1 of the front wheel becomes again "1" before time t5. However, the brake fluid pressure P is maintained constant. The duration of the output AV is equal to that of the output AV2'. Or it is within the limit time determined by the ON-delay timer 105.

Hereinafter, the output EV1 becomes periodically "0", "1", "0"...... . Accordingly, the brake fluid pressure P rises in a stepwise manner as shown in FIG. 8B. The output AV1, and therefore the output AV become again "1" at time t6. The output EV is "1", while the output AV is "1". The brake fluid pressure P is decreased for the duration of the output AV.

As the result, the brake fluid pressure P of the front wheel 6a changes as shown in FIG. 8B. The wheel speed V of the front wheel 6a changes as shown in FIG. 8A. On the other hand, the brake fluid pressure P' of the rear wheel 11a changes by function of the valve apparatus 8, as shown in FIG. 8B, and the wheel speed V' of the rear wheel changes as shown in FIG. 8A. All of the wheels are prevented from locking. The left wheels 6b and 11b are controlled in a similar manner.

When the skid conditions of only the front wheels 7a, 6b are judged as in the prior art, in which the approximate vehicle speed is formed from all of the wheels, and when the fluid pressure control valve devices 4a, 4b are controlled with the thus obtained judge results, the brake fluid pressures P, P' of the front and rear wheels would change as shown by the dash-lines in FIG. 8B. The front wheel is so skid-controlled as to be prevented from locking. However, the rear wheel is locked. Since the limit lock pressure of the front wheel is very high, the brake fluid pressure of the rear wheel would become higher than the limit lock pressure R. Although the brake fluid pressure of the rear wheel changes with the control of the brake fluid pressure of the front wheel, as shown by the dash-lines in FIG. 8B, the change range of the fluid pressure of the rear wheel is small, and the brake fluid pressure of the rear wheel remains higher than the limit lock pressure R. As shown by the dash-lines in FIG. 8A, the wheel speed of the front wheel is decreased under the skid control operation. However, the wheel speed of the rear wheel would rapidly become zero or be locked.

Next, there will be described the case that the front wheels are provided with spike tires or chains, and that the vehicle runs on the road which is uniform in frictional coefficient.

Figure 5:
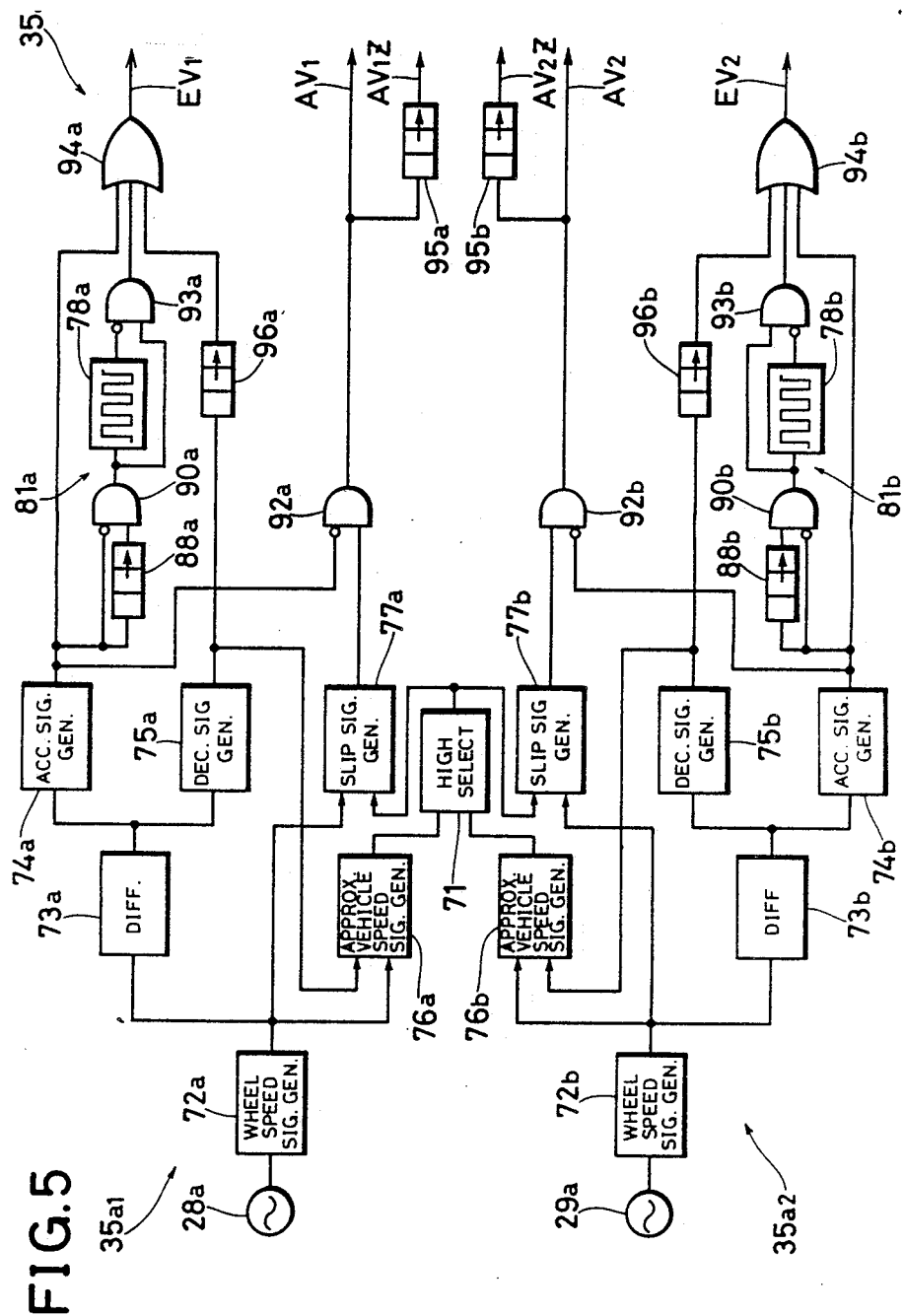
FIG. 5 is a circuit diagram of a first judge circuit in FIG. 3.

For simplifying the description, it is assumed that both of the rear wheels reach the skid condition at the same time. The deceleration signal −b is generated from the deceleration signal generators 75b (hereinafter designated only with respect to the one conduit system) for the rear wheels 11a, 11b. In FIG. 5, the outputs EV2, EV2' of the OR gates 94b become "1". On the other hand, the slip signal is not yet generated from the slip signal generators 77a for the front wheels 6a, 6b, and so the outputs AV', AV1, AV1', AV', of the AND gates 92a are "0". Accordingly, the outputs AV1Z and AV1Z' are "0".

Figure 9:
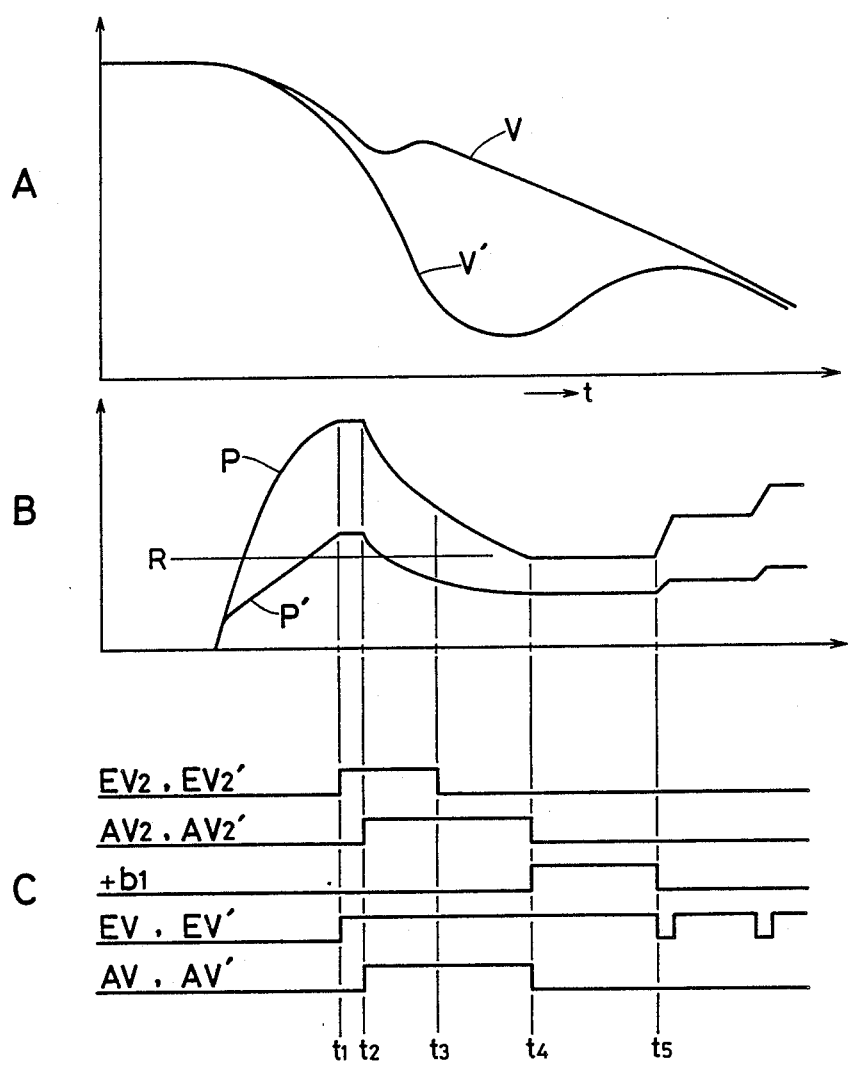

Referring to FIG. 6, the outputs of the AND gates 101, and therefore, the outputs EV and EV' of the logic circuits 36a and 36b become "1" at time t1 as shown in FIG. 9C. Accordingly, the brake fluid pressure P and P' of the front wheels 6a, 6b and rear wheels 11a, 11b are maintained constant.

The slip signal S is generated from the slip signal generators 77b at time t2. Or the slip of the rear wheels 11a, 11b becomes larger than the predetermined slip. The outputs AV2, AV2' of the AND gates 92b become "1". Thus, the outputs AV, AV' of the logic circuits 36a, 37b become "1" at time t2, as shown in FIG. 9C. The brake fluid pressure P of the front wheels 6a, 6b decreases with time, as shown in FIG. 9B. Accordingly, the brake fluid pressure P' of the rear wheels 11a, 11b decreases.

The outputs EV2, EV2' disappear at time t3. However the output of the OR gate 100 remains "1", and therefore the outputs EV, EV' of the logic circuits 36a, 36b remain "1". Accordingly, the brake fluid pressures P and P' of the front and rear wheels continue to decrease as shown in FIG. 9B.

The acceleration signal +b is generated from the acceleration signal generators 74b. Even when the slip signal S is still generated from the slip signal generators 77b, the outputs AV2, AV2' of the AND gates 92b become "0". However, the accelerator signal +b is supplied to the fourth input terminals of the OR gates 94b. Accordingly, the outputs EV2, EV2' of the OR gates 94b remain "1".

The outputs AV1Z and AV1Z' are still "0". The outputs AV and AV' of the logic circuits 36a and 36b become "0". However, the outputs EV and EV' remain "1", as shown in FIG. 9C. Accordingly, the brake fluid pressures P and P' of the front and rear wheels are maintained constant.

The acceleration signal +b disappears at time t5. The pulse generator 81b starts to operate. The outputs EV2, EV2', and therefore EV, EV' change periodically as "0", "1", "0", "1", .... Accordingly, the brake fluid pressures P and P' increases in a stepwise manner, as shown in FIG. 9B.

As above described, as soon as the rear wheels 11a, 11b tend to lock, the brake fluid pressure P' is maintained constant or decreased. Accordingly, although the brake fluid pressure P' may temporarily become higher than the limit lock pressure R, it can be rapidly lowered under the limit lock pressure R. The rear wheels are prevented from locking. The front wheels 6a, 6b are controlled with the skid condition of the rear wheels 11a, 11b, before they tend to lock. Accordingly, the front wheels do not lock.

When both of the rear wheels do not reach the skid condition at the same time, the one front wheel is controlled with the skid condition of the one rear wheel at the same side. The other rear wheel is controlled in accordance with the fluid pressure of the one front wheel through the valve apparatus 8.

Next, there will be described the case that one of the two conduit systems fails.

For example, when brake fluid leaks from the one conduit system including the conduit 3, the fluid pressures of the wheel cylinders 7a and 12b do not increase by treading the brake pedal 2. On the other hand, the fluid pressure of the other conduit system including the conduit 16 increases by treading the brake pedal 2. Accordingly, the piston 38 is moved rightwards in the valve apparatus 8. Since the anti-skid control is not effected, the contact 55 remains closed. The switch 52 is actuated with the movement of the piston 38. Electric current flows through the warning lamp 56 from the battery 57. The warning lamp 56 lights. Thus, the vehicle driver knows that the anti-skid apparatus has failed. When the anti-skid apparatus does not fail, the contact 55 is opened with the beginning of the anti-skid control operation (for example, the beginning of the drive of the fluid pressure pump 20). Accordingly, the warning lamp 57 does not light with the movement of the piston 38.

The further effects or advantages of the above described embodiment are as follows:

Even when some circuits such as wheel speed signal generators 28b, 29a for the one conduit system are out of order, the front and rear wheels 6a, 6b, 11a, 11b can be nearly adequately skid-controlled.

The brake fluid pressure of the rear wheels 11a, 11b are controlled in accordance with the lower of the brake fluid pressures of the front wheels 6a, 6b through the valve apparatus 8. Accordingly, both of the rear wheels 11a, 11b are prevented from locking even on the split road. If both of them were to the steering ability would be lost. Also, when the one of the fluid pressure control valves 4a and 4b is out of order, both of the rear wheels are prevented from locking.

As shown in FIG. 5, the approximate vehicle speed signals E are formed from the respective wheel speeds, and the higher of the two approximate vehicle signals from the front and rear wheels of each conduit system is selected for calculating the slips of the respective wheels. The higher is nearer to the true vehicle speed, and the slips from the higher approximate vehicle speed are nearer to the true slip.

In a typical vehicle, one of the front and rear axles is a drive axis. The drive wheel is later in response to the brake torque under the influence of engine torque. When the higher of the wheel speeds of the drive and non-drive wheels is selected, the change of the approximate vehicle speed is nearer to that of the true vehicle speed.

When the vehicle is rapidly braked while cornering on the high-$\mu$ road, load changes to the wheels occur due to the centrifugal force acting latelally on the vehicle and to the braking force in the moving direction of the vehicle. The loads to the wheels are reduced in the order of the outer front wheel with respect to the cornering → the inner front wheel with respect to the cornering → the outer rear wheel with respect to the cornering → the inner rear wheel with respect to the cornering. The larger the load is, the harder to lock the wheel is. When the rotational data of the two wheels diagonally combined with each other in the conduit system are combined and the higher wheel speed is selected, the approximate vehicle speed signal represents the nearer to the true vehicle speed. Accordingly, the slips of the wheels can be more accurately calculated.

While the preferred embodiment has been described, variations thereto will occur to those skilled in the art within the scope of the present inventive concepts which are delineated by he following claims.

For example, the judge circuit is not limited to that of FIG. 5, but a well-known judge circuit may be applied to this invention.

In the above embodiment, when the durations of the outputs AV2, AV2' are too long, they are limited to the predetermined time by the ON-delay timer 105. However, the outputs AV2, AV2' may be directly supplied to the OR gates 100 and 103 without limitation of time.

Further, in the above embodiment, the fluid pressure control valves 4a and 4b consist of inlet and outlet valves 33a, 34a, and 33b, 34b, respectively. However, they may consists of a single three-position valves, respectively.

Further, in the above embodiment, the higher of the two approximate vehicle speed signals is selected for calculating the slip. Insteads, the higher of the two wheel speed signals may be selected for forming the approximate vehicle speed signal.

Further, the approximate vehicle speed may be formed from all of the wheel speed signals.

Further in the above embodiment, the proportioning valves 32a and 32b are arranged between the valve apparatus 8 and the wheel cylinders 12a and 12b. However, they may be omitted.

What is claimed is:

1. In an anti-skid control apparatus for a vehicle braking system including:

(a) a pair of front wheels and a pair of rear wheels, each of said wheels having a wheel cylinder associated therewith wherein said wheel cylinders are diagonally connected by conduits.

(b) a tandem master cylinder having first and second fluid pressure generating chambers;

(c) a first fluid pressure control valve means for controlling the brake fluid pressure of the wheel cylinder of one of the front wheels, the first means arranged between the first fluid pressure generating chamber of the tandem master cylinder and the wheel cylinder of the one front wheel;

(d) a second fluid pressure control valve means for controlling the brake fluid pressure of the wheel cylinder of the other of said front wheels, arranged between the second fluid pressure generating chamber of said tandem master cylinder and the wheel cylinder of the other front wheel;

(e) a control means for judging the skid conditions of said front and rear wheels and for generating instructions for controlling said first and second fluid pressure control valve means, said control means including judge circuit means for receiving the wheel speed signals of said front and rear wheels, respectively, and for judging the skid conditions of said front and rear wheels and generating brake pressure control signals for the respective wheels; and (f) a valve apparatus arranged between said wheel cylinders of the front wheels and the wheel cylinders of the rear wheels including a piston means receiving the output pressures of said first and second fluid pressure control valve means and movable by the difference between said output pressures, and a pair of valves able to open and close with the movement of said piston means, and generating a fluid pressure in relation with the lower one of said output pressures; the improvements in which said control means further comprises logic circuit means for combining logically the brake pressure control signal as the judging result of the skid condition of the one front wheel with that of the rear wheel located at the same side of the road as said one front wheel, for generating the instructions for controlling said first fluid pressure control valve means, and for combining logically the brake pressure control signal as the judging result of the skid condition of the other front wheel with that of the rear wheel located at the same side of the road as said other front wheel for generating the instruction for controlling said second fluid pressure control valve means.

2. An anti-skid control apparatus according to claim 1 in which said judge circuit means generates the brake pressure control signals for relieving the brake of said front or rear wheel, and for maintaining the brake pressure of said front or rear wheel constant and when said brake pressure control signal is obtained from said front or rear wheel on the same side of the road, said corresponding one of said first and second fluid pressure control valve means controlled for relieving the brake pressure or maintaining the brake pressure constant.

3. An anti-skid control apparatus according to claim 2, in which the duration of the control signal for relieving the brake is limited to a predetermined time.

4. An anti-skid control apparatus according to claim 1, in which a slip signal is formed in said control means, and the larger of approximate vehicle speed signals formed from said wheel speeds of said front and rear wheels connected diagonally to each other in the conduit system is selected for forming said slip signal.

5. An anti-skid control apparatus according to claim 1, in which said valve apparatus comprises a casing, a piston slidably fitted to said casing, input and output chambers formed at both sides of said piston, input ports communicating with said input chambers, respectively, output ports communicating with said output chambers, respectively, and valve members arranged between said input and output chambers, and operated by said piston, wherein one of said input ports is connected to the wheel cylinder of the right front wheel, one of said output ports which communicates with the one of said output chambers being at the same side as the input chamber communicating said one of the input ports, is connected to the wheel cylinder of the left rear wheel, the other of said input ports is connected to the wheel cylinder of left front wheel, the other of said output ports which communicates with the other of said output chambers being at the same side as the input chamber communicating said other of the input ports, is connected to the wheel cylinder of the right rear wheel.

6. An anti-skid control apparatus according to claim 5, in which a fail detecting switch is engaged with said piston.

* * * * *